United States Patent [19]
Okano

[11] 3,753,480
[45] Aug. 21, 1973

[54] STOPPING FOR FILM RETRIEVAL

[75] Inventor: Takeshi Okano, Nishinomiya-shi, Japan

[73] Assignee: Fuji Shashin Film Kabushiki Kaisha, Kanagawa-ken, Japan

[22] Filed: June 21, 1971

[21] Appl. No.: 154,962

[30] Foreign Application Priority Data
June 29, 1970 Japan.............................. 45/65187

[52] U.S. Cl.............. 192/141, 192/142 R, 192/149, 353/27
[51] Int. Cl....................... F16d 71/04, G03b 23/08
[58] Field of Search....................... 353/27; 192/141, 192/142 R, 149

[56] References Cited
UNITED STATES PATENTS

| 701,872 | 6/1902 | Giacomini | 192/149 |
| 1,636,324 | 7/1927 | Reed | 192/149 |
| 1,417,093 | 5/1922 | Molyneux | 192/149 |
| 1,730,014 | 10/1929 | Reece | 192/149 |
| 1,915,910 | 6/1933 | Allen et al. | 192/149 |
| 2,010,366 | 8/1935 | Kearns | 192/149 X |
| 3,655,279 | 4/1972 | Rathfelder | 353/27 |

*Primary Examiner*—Allan D. Herrmann
*Attorney*—Stevens, Davis, Miller & Mosher

[57] ABSTRACT

In a device for restricting the stopping position of a film shifting mechanism by means of a cam stopper provided between the film shifting mechanism and a cam, a shock absorbing spring is disposed between the cam and a driving shaft. On the driving shaft are mounted two cams consisting of a normal rotation stopping cam and a reverse rotation stopping cam, and two stoppers are provided to stop the respective cams. These two stoppers are operated by a single operating lever.

8 Claims, 3 Drawing Figures

PATENTED AUG 21 1973          3,753,480

STOPPING FOR FILM RETRIEVAL

BACKGROUND OF THE INVENTION

This invention relates to improvements in a drive for selectively positioning a desired frame of a film, having a plurality of frames, at the center of a projecting lens system, particularly in the device for retrieving a desired piece of information, i.e. frame, from an optical information recording media, such as a microfiche, having a number of frames arranged at a predetermined pitch, and for shifting said frame into the light path of a projecting lens system.

Devices as known for retrieving a desired frame from a film having a plurality of frames, such as a microfiche, shifting said frame into the light path of an enlarging projecting lens system and reproducing the selected optical information by projecting it onto a screen or the like, but all of them require a film shifting mechanism. The film shifting mechanism is required to be able to finally stop the film correctly in a position corresponding to a desired frame. To this end, digital control means is preferred rather than analogue control means for controlling the stopping position. For digital control, use of a ratchet, a cam, a sprocket, etc. has been known.

In the type of digital stopping device used heretofore, the cam and the other members are stopped so suddenly at the time of the stopping operation that the mechanical structure is subjected to a large shock created due to inertia and occasionally damaged thereby.

Further, in this type of retrieving device the film or the like is shifted reciprocally and two cams or the like are used each for stopping the film moving in each direction. Therefore, there has been the disadvantage that the mecahnism for controlling the two cams becomes somewhat complicated.

SUMMARY OF THE INVENTION

The first object of the present invention is to provide a stopping device having means for absorbing the shock due to inertia, to overcome one of the above-mentioned disadvantages of the prior art devices.

Another object of the invention is to provide a stopping device in which the mechanism for controlling the two cams is simplified, so as to eliminate the complicated structure of the prior art devices described above.

In order to attain the objects set forth above, the stopping device according to the present invention is so constructed that a shock absorbing spring is provided between a driving shaft and each of a forwarding cam and a releasing cam, and further stop levers for stopping said cams are operated by a single operating member.

The other objects, features and advantages of the invention will become apparent from the following detailed description on the preferred embodiment of the invention.

DESCRIPTION OF THE PREFERRED EMBODIMENT

Figure 1:
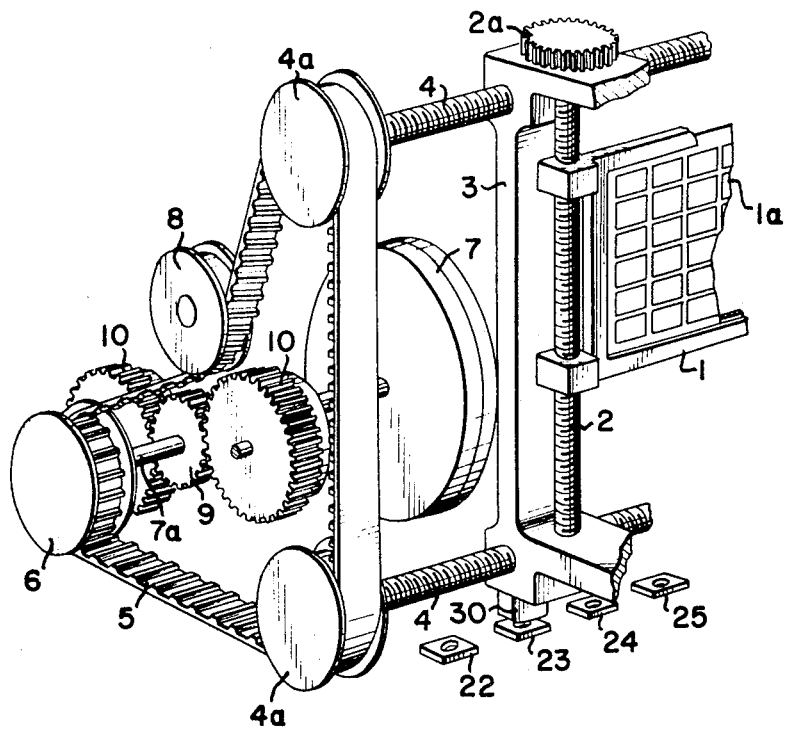
FIG. 1 is a perspective view showing one form of the mechanism for causing a reciprocal movement of a film used in association with the present invention, for retrieving a desired frame of the film.

Now, the present invention will be described with reference to the drawing. Referring to FIG. 1, reference numeral 1 designates a frame structure for retaining a microfiche 1a, which is threadably mounted on a rotatable vertical screw rod 2 and moved up and down on said screw rod incident to rotation of the latter. Reference numeral 2a designates a gear fixed to the upper end of the screw rod 2 and driven by a gear not shown. The vertical screw rod 2 is journaled at the opposite ends thereof in a frame 3 which is threadably mounted on two parallel horizontal screw rods 4, 4 and moved horizontally on said screw rods incident to rotation of the latter. Toothed pulleys 4a, 4a are fixed to one ends of the screw rods 4, 4 and rotated by a driving gear 6 by way of a corrugated belt 5. The driving gear 6 is fixedly mounted on a driving shaft 7a of a motor 7 and driven from said motor. Reference numeral 8 designates an idler which serves to provide a tension on the corrugated belt 5. On the driving shaft 7a of the motor 7 is fixedly mounted another gear 9. This gear 9 is interposed between a pair of stopping gears 10, 10 in intermeshing engagement therewith. The stopping gears 10, 10 respectively have cams 11, 11 thereon (see FIG. 2) and are stopped by cam stoppers 16, 16.

Figure 2:
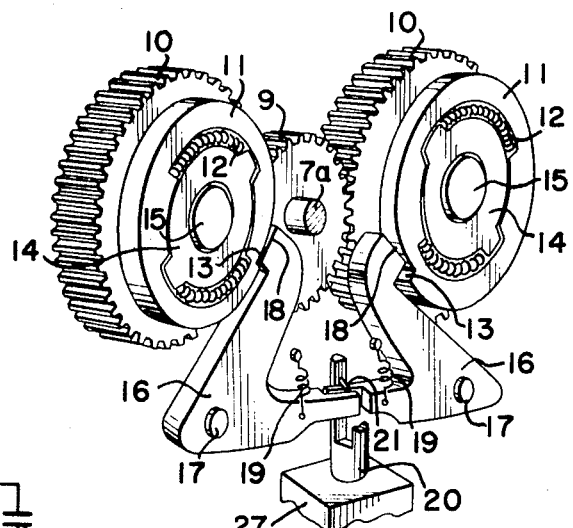
FIG. 2 is a perspective view showing the essential portion of the embodiment of the stopping device shown in FIG. 1.
Figure 3:
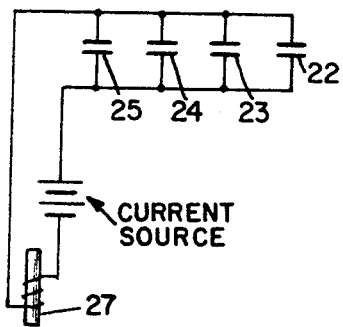
FIG. 3 is a schematic wiring diagram of the control circuit of the invention.

FIG. 2 shows the gear 9 and the stopping gears 10, 10 as viewed from the motor 7. The cams 11, 11 are mounted on the gears 10, 10 through shock absorbing springs 12 and formed with steps 13, 13 respectively. Reference numerals 14, 14 designate portions of the gears 10, 10, through which said gears 10, 10 and the cams 11, 11 are operatively asociated with each other respectively. The gears 10, 10 and the cams 11, 11 are mounted on a side wall (not shown) of the device by pins 15, 15 fixed on said side wall. Cam stoppers 16, 16 are pivotally mounted on fixed pivot pins 17, 17 respectively. Each cam stopper 16 is formed at one end with a pawl 18 adapted for engagement with the step 13 of the corresponding cam 11. Each cam stopper 16 is biased into the stopping position by a spring 19, with its pawl 18 in pressure engagement with the peripheral surface of the corresponding cam 11. Reference numeral 20 designates a movable member of a solenoid 27, which acts as an operating lever and has a pin 21 thereon by which the other end of each stopper 16 is depressed, whereby the pawl 18 of said stopper 16 is disengaged from the peripheral surface of the cam 11 against the biasing force of the spring 19.

Referring back to FIG. 1, reference numerals 22, 23, 24, 25 ... designate microswitches provide in the same number as the number of the frames in the horizontal direction of the microfiche 1a and arranged on the bottom wall of the device at the same pitch as that of said frames in parallel relation to the screw rods 4, 4, and reference numeral 30 designates a projection provided at the bottom end of the frame 3 for engagement with the respective microswitches 22, 23 ... The width of the projection 30 is so selected that the projection 30 engages the microswitch to open the same just before the selected frame of the microfiche is located in the correct position of the optical system, no matter in which direction the microfiche is shifted.

In the device constructed as described above, when a switch (not shown) carrying the number of the desired frame thereon is pushed, the solenoid 27 shown in FIG. 2 is actuated and its movable member 20 is moved down, so that the cam stoppers 16, 16 are caused to make a pivotal movement by said movable member 20 and the pawls 18, 18 thereof are disengaged from the steps 13, 13 of the respective cams 11, 11, thus providing for free rotation of the gears 10, 10. At the same time, the motor 7 is set in motion and its rotation is transmitted to the toothed pulleys 4a, 4a through the driving gear 6 and the belt 5, causing the screw rods 4, 4 to rotate. The gears 10, 10 are also driven concurrently. The motor 7 is disconnected from the power source when the projection 30 is brought into contact with the microswitch corresponding to the frame desired to be retrieved. The motor 7 and the other microfiche driving mechanism do not stop immediately due to inertia. The movable member 20 of the solenoid moves upward at the same time, so that the pawls 18, 18 of the stoppers 16, 16 are brought into sliding engagement with the peripheral surfaces of the cams 11, 11 under the biasing forces of the springs 19, 19 respectively and, when either one of the pawls 18, 18 is engaged by either one of the steps 13, 13, said pawl holds the cam against rotation which tends to rotate continuously under intertia of the microfiche driving mechanism.

For instance, when the gear 9 rotates in a counter-clockwise direction, the gears 10, 10 and the cams 11, 11 rotate in a clockwise direction. The upward movement of the movable member 20 of the solenoid allows the cam stoppers 16, 16 to move upwards under the biasing forces of the springs 19, 19, which levers have been restrained by the pin 21, and thus the pawl 18 on the right side (as viewed in FIG. 2), abuts against the step 13 of the right hand cam 11, whereby said cam 11 is held against rotation. The shock in this case is absorbed by the springs 12 between the portion 14 of the right hand gear 10 and the cam 11. Therefore, the gears are stopped in predetermined positions, before the gears 10, 10 make a complete turn subsequent to the engagement between the projection 30 and the pertinent microswitch. No slippage occurs between the toothed pulleys 6, 4a, 4a and the belt 5. Therefore, by arranging such that the frame structure 1 is shifted exactly one pitch of the frames of the microfiche (i.e. one pitch of the microswitches 22, 23 . . . during an integer number of revolutions (e.g. three revolutions) of the gears 10, 10, it is possible to stop the desired frame of the microfiche accurately in the projecting lens system. It will be obvious that the motor 7 must be disconnected from the power source to cause the upward movement of the movable member 20 of the solenoid, during one revolution of the gears 10, 10 immediately before the desired frame of the microfiche is correctly positioned in the lens system.

When the driving shaft 7a of the motor rotates in a clockwise direction and hence the gears 10, 10 rotate in the reverse direction, the left hand cam 11 is stopped by the cam stopper 16. The cam stoppers 16, 16 make a pivotal movement independently of each other when the movable member 20 of the solenoid is in its upward projected position, but are disengaged from the respective cams 11, 11 concurrently when said movable member 20 moves downward.

By employing the device described and illustrated herein, it is possible, in an apparatus wherein a film having a number of frames arranged at a predetermined pitch is reciprocated for retrieving a desired frame from said film, to accurately stop the desired frame in the optical system by means of one solenoid, regardless of the inertia of a film shifting mechanism.

I claim:

1. A stopping device in a mechanism for shifting a film or the like, comprising a driving shaft for effecting the shifting of the film, one gear driven by said driving shaft, two gears meshing with said one gear, cam members positioned on each of said two gears through shock absorbing means in such a manner that the positions of said cam members are reverse to each other with respect to the rotating direction of said gears, two cam stoppers engageable with said respective cam members for stopping the rotation thereof and an operating lever adapted to move concurrently both of said two cam stoppers between the positions in which said cam stoppers are engageable with said cam members and the positions in which said cam stoppers are disengaged from said cam members.

2. A stopping device according to claim 1, wherein said shock absorbing means is a spring member disposed between said gear and said cam member coaxial with said gear.

3. A stopping device according to claim 1, wherein said operating lever is a movable member of a solenoid.

4. A stopping device according to claim 3, wherein each of said cam stoppers is spring-biased such that it is engaged by the cam member when said solenoid is deenergized.

5. A stopping device according to claim 1, wherein said two cam stoppers are pivotable substantially L-shaped levers having ends joined in overlapping relation with each other and said operating lever is held in engagement with said cam stoppers at said overlapping portion.

6. A stopping device according to claim 1, wherein a toothed pulley is fixedly mounted on said driving shaft and screw rods are rotated by a corrugated belt which is driven by said pulley, so that a film carrier frame threadably mounted on said screw rods is shifted when the screw rods are rotated.

7. A stopping device according to claim 6, wherein a microswitch operating projection is formed on a portion of said frame and microswitches are arranged side by side along the path of movement of said projection at the same pitch as that of the film frames.

8. A stopping device according to claim 7, wherein said microswitches are of the normally open type and connected in series with a solenoid which moves said operating lever.

* * * * *